United States Patent [19]

Levin et al.

[11] 4,141,822
[45] Feb. 27, 1979

[54] PHOSPHATE STRIPPING OF SEWAGE

[75] Inventors: Gilbert V. Levin, Chevy Chase, Md.; Alexandra G. Tarnay, Fairfax, Va.; George J. Topol, deceased, late of Montgomery County, Md.; by Citizens Bank and Trust Company, legal representative, Riverdale, Md.

[73] Assignee: Union Carbide Corporation, New York, N.Y.

[21] Appl. No.: 811,595

[22] Filed: Jun. 30, 1977

Related U.S. Application Data

[63] Continuation-in-part of Ser. No. 581,951, Jun. 4, 1975, abandoned, which is a continuation-in-part of Ser. No. 481,793, Jun. 21, 1974, abandoned.

[51] Int. Cl.² .............................................. C02C 1/17
[52] U.S. Cl. .......................................... 210/6; 210/7; 210/8; 210/14; 210/16; 210/18
[58] Field of Search ....................................... 210/2–9, 210/14–16, 18, 21

[56] References Cited
U.S. PATENT DOCUMENTS

| | | | |
|---|---|---|---|
| 3,235,487 | 2/1966 | Westgarth | 210/4 |
| 3,236,766 | 2/1966 | Levin | 210/6 |
| 3,385,785 | 5/1968 | Forrest et al. | 210/6 |
| 3,386,910 | 6/1968 | Forrest | 210/6 |
| 3,390,077 | 6/1968 | Forrest | 210/6 |
| 3,654,147 | 4/1972 | Levin et al. | 210/16 |

Primary Examiner—Frank A. Spear, Jr.
Assistant Examiner—Peter A. Hruskoci
Attorney, Agent, or Firm—Steven J. Hiltquist

[57] ABSTRACT

Activated sludge sewage treatment process comprising aerating a mixed liquor comprising phosphate-containing influent sewage material to cause the microorganisms present to take up phosphate, separating phosphate-enriched sludge from the mixed liquor, and settling the separated sludge in a phosphate stripping zone to form supernatant liquor and settled sludge. At least part of the settled sludge is maintained under anaerobic conditions to cause release of soluble phosphate and the resulting sludge containing released phosphate is contacted with a lower soluble phosphate content medium to effect phosphate enrichment of the supernatant liquor in the stripping zone, with at least a portion of the anaerobic sludge being recirculated to the aeration zone.

17 Claims, 1 Drawing Figure

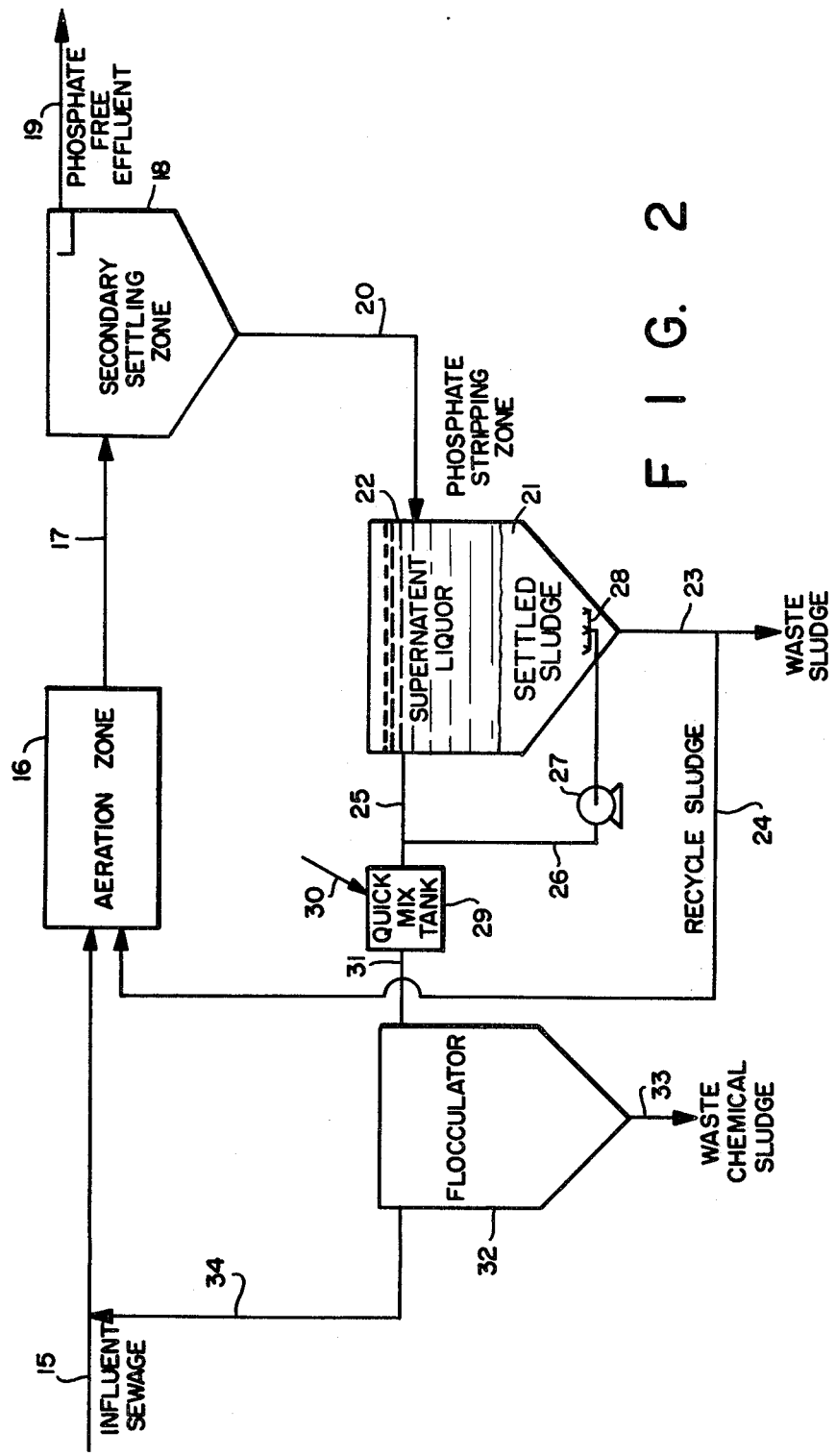

PHOSPHATE STRIPPING OF SEWAGE

CROSS REFERENCE TO RELATED APPLICATIONS

This application is a continuation-in-part of Ser. No. 581,951 filed June 4, 1975 in the names of Gilbert V. Levin et al now abandoned, which is in turn a continuation-in-part of Ser. No. 481,793 filed June 21, 1974 in the names of Gilbert V. Levin et al, now abandoned.

BACKGROUND OF THE INVENTION

This invention relates to an activated sludge sewage treatment process for treating raw or treated phosphate-containing sewage to obtain a substantially phosphorous-free effluent which is returned to natural water resources.

In the conventional activated sludge system in use today, sewage is subjected to the usual screening and preliminary sedimentation procedures, then mixed with activated sludge recycled from a settling tank to form a mixed liquor which is subjected to aeration. During aeration of the mixed liquor, the organisms present cause the aerobic decomposition of solids and a high degree of BOD removal is achieved.

Phosphates, which are present in organic wastes and detergents, escape conventional sewage treatment processes and are released with the effluent into natural water resources, e.g., lakes, rivers and streams. These phosphates result in over fertilization or eutrophication of waters causing unsightly algal blooms and serious pollution problems.

It is known that aeration of the mixed liquor in an activated sludge sewage treatment process initially causes the microorganisms present to take up phosphate. U.S. Pat. No. 3,236,766 discloses a process which utilizes this phenomenon for removing phosphates from sewage. According to the process disclosed in that patent, the pH of raw sewage is adjusted, if necessary, to maintain a range of from about 6.2 to about 8.5, the sewage is mixed with activated sludge to form a mixed liquor, the mixed liquor is aerated to maintain a dissolved oxygen content of at least 0.3 mg. per liter in the mixed liquor and a phosphate-enriched sludge is separated from the mixed liquor to provide a substantially phosphate-free effluent. The phosphate-enriched sludge is treated to reduce the phosphate content thereof prior to recycling for mixing with the influent sewage. This is accomplished by maintaining the phosphate-enriched sludge in an anaerobic condition for several hours.

Several other processes have been proposed for reducing the phosphate content of phosphate-enriched sludge following the aeration step in an activated sludge sewage treatment process. Thus, for example, U.S. Pat. No. 3,385,785 discloses adjusting the pH of phosphate-enriched sludge to between about 3.5 and 6 and agitating the sludge in contact with a low phosphate-containing aqueous medium in a tank for a time sufficient to effect transfer of water-soluble phosphate material from the sludge to the aqueous phase. The low phosphate-containing aqueous medium used in this tank is water added from an external source to leach out the phosphate from the sludge. After the soluble phosphate has been leached out of the sludge into the aqueous medium, the mixture is passed to a settling tank wherein the phosphate-enriched aqueous medium is separated from the phosphate-depleted sludge. Since this process requires the addition of considerable quantities of water from an external source and requires two separate tanks — i.e., a phosphate leaching tank and a settling tank, to separate the soluble phosphate from the sludge, a large capital investment is required in such a process.

Accordingly, it is an object of this invention to provide an improved process for reducing the phosphate content of phosphate-containing sewage in an activated sludge sewage treatment process.

It is a further object of this invention to provide such a process which includes an improved phosphate stripping operation of phosphorous-enriched sludge and which results in increased efficiency of the phosphate removal from the sewage.

Other objects and advantages of this invention will be apparent from the ensuing disclosure and claims.

SUMMARY

This invention relates to an activated sludge process for treating raw or treated phosphate-containing sewage to obtain a substantially phosphorous-free effluent.

The process of this invention comprises aerating a mixed liquor comprising phosphate-containing influent sewage material and activated sludge in an aeration zone to reduce the BOD content of the sewage material and to cause the microorganisms present to take up phosphate. Phosphate-enriched sludge is separated from the mixed liquor to provide a substantially phosphate-free effluent. This phosphate-enriched sludge is passed to a phosphate stripping zone and settled to form supernatant liquor in the stripping zone upper section, and settled sludge. At least part of the settled sludge is maintained under anaerobic conditions for a time sufficient to release phosphate to the liquid phase of the settled sludge. The anaerobic sludge containing released phosphate is contacted with a lower soluble phosphate content medium to transfer the soluble phosphate in the anaerobic sludge liquid phase to said lower soluble phosphate content medium, for phosphate enrichment of supernatant liquor in the stripping zone upper section. At least a portion of the anaerobic sludge is recycled from the phosphate stripping zone to the aeration zone as the aforementioned activated sludge therefor.

As used herein, the term "sludge" refers to a solids-liquid mixture characterized by a sludge solids phase and an associated liquid phase. The term "lower soluble phosphate content medium" refers to an aqueous or water-containing medium which contains a lower concentration of soluble phosphate than the released phosphate-containing anaerobic sludge with which it is contacted.

In accordance with the present invention phosphate-enriched sludge, in which the phosphate is present in the cells of the sludge microorganisms, i.e., biological solids, is maintained under anaerobic conditions in the settled sludge in the phosphate stripping zone for a time sufficient to cause the micororganisms to release phosphate to the liquid phase of the sludge. The resultant anaerobic sludge containing released phosphate is contacted with a lower soluble phosphate content medium. The purpose of such contacting is to transfer soluble phosphate out of the anaerobic sludge and ultimately to the supernatant liquor in the stripping zone, so as to effect a phosphate enrichment of the supernatant liquor therein. In accordance with the invention, the soluble phosphate in the anaerobic sludge may be transferred either directly by contacting the anaerobic sludge with the supernatant liquor or indirectly, as for example by contacting the anaerobic sludge with the phosphate-enriched sludge passed to the stripping zone.

Without the aforementioned contacting/transfer steps, a considerable time would be required for the released soluble phosphate in the anaerobic sludge, and particularly in the settled sludge in the lowermost section of the stripping zone, to migrate out of the settled sludge layer and into the supernatant liquor in the stripping zone. Under such conditions, if the sludge were withdrawn from the stripping zone and recycled to the aeration zone before a sufficient amount of the soluble phosphate is transferred to the supernatant liquor, an excess amount of soluble phosphate will be recycled to the aeration zone and the phosphate removal efficiency of the overall process will be lowered. The present invention overcomes such difficulty and has been demonstrated in actual operation to achieve a high level of phosphate removal efficiency.

BRIEF DESCRIPTION OF THE DRAWINGS

FIG. 2 is a schematic flowsheet of an activated sludge process according to another embodiment of the invention, wherein a portion of the supernatant liquor in the phosphate stripping zone is withdrawn therefrom and is reintroduced into the stripping zone underneath the layer of anaerobic sludge containing released phosphate for contacting therewith.

DESCRIPTION OF THE PREFERRED EMBODIMENTS

Figure 1:
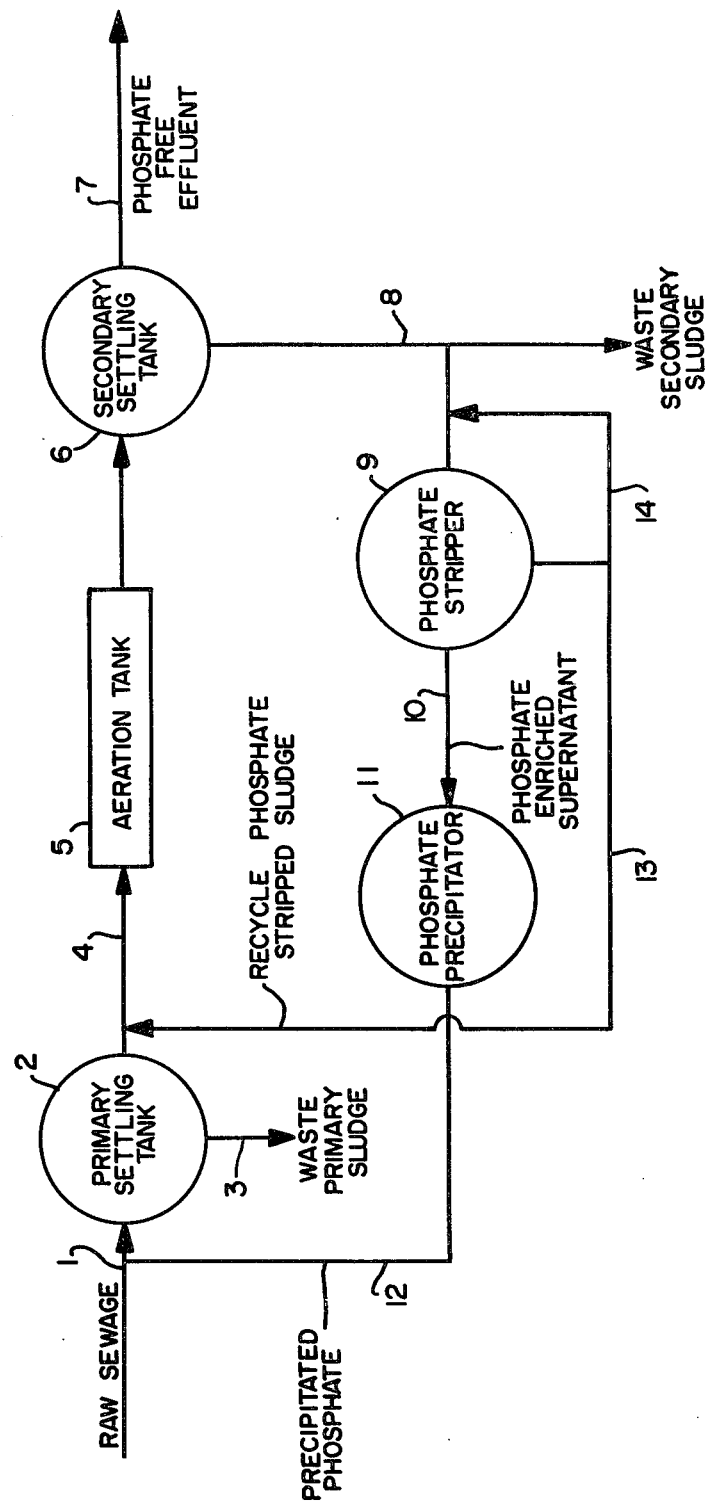
FIG. 1 is a schematic flowsheet of an activated sludge process according to one embodiment of the invention, wherein anaerobic sludge containing released phosphate is contacted with the phosphate-enriched sludge passed to the stripping zone.

Referring now to the drawings, FIG. 1 shows an illustrative process system according to the present invention. A raw phosphate-containing sewage influent stream 1 is passed through conventional screening and grit-removing units and is optionally subjected to primary settling in a primary settling tank 2 from which primary settled sludge is removed in line 3. The primary settled sewage is mixed with recycled, activated sludge hereinafter described to form a mixed liquor and is passed by line 4 to the aeration tank 5.

In the aeration tank, the mixed liquor is aerated at a rate sufficient to maintain it aerobic — i.e., so that there is a measurable amount of dissolved oxygen present in the mixed liquor in at least a part of the aeration tank, for a period of 1 to 8 hours. During aeration, the microorganisms present take up phosphate and consume organic matter present in the sewage. A high degree of BOD removal is obtained during aeration.

After aeration, the mixed liquor is fed into a secondary settling tank 6. In the secondary settling tank 6, phosphate-enriched sludge settles and thereby separates from the liquor. The sludge contains a substantial portion of the phosphate present in the sewage. The substantially phosphate-free effluent is discharged for disposal in a conventional manner by line 7.

The phosphate-enriched sludge is removed from the settling tank 6 by line 8. A portion of the sludge may be delivered to waste and the remainder contacts and mixes with recycled, anaerobic sludge from the phosphate stripper which contains a high concentration of soluble phosphate and the mixture is passed to the phosphate stripper 9. In the phosphate stripper 9, the phosphate-enriched sludge is settled to form supernatant liquor in the upper section of the stripping zone, and settled sludge. At least part of the settled sludge is maintained under anaerobic, i.e., non-aerobic, conditions for a time sufficient to cause the microorganisms in the anaerobic sludge to release phosphate to the liquid phase associated with the anaerobic settled sludge. The phosphate leaks out of the anaerobic sludge solids into the liquid phase. The mechanism of this treatment will be described in more detail hereinbelow.

A phosphate-enriched supernatant liquor is produced in the phosphate stripper 9 and is passed by line 10 to the phosphate precipitator 11. A phosphate precipitant, such as aluminum or iron salts or lime, is mixed with the phosphate-enriched supernatant liquor in the phosphate precipitator 11 to precipitate phosphate. The precipitated phosphate is passed by line 12 for mixing with raw sewage in line 1.

In the phosphate stripper 9, sludge solids, containing a high amount of phosphate in the cells of the organisms in the sludge, separate from the aqueous phase of the sludge and settle toward the bottom of the phosphate stripper. Thus, the solid particles in the sludge contain intracellular phosphate and these particles settle into the layer of settled sludge in the phosphate stripper 9. A density gradient exists in the layer of settled sludge, the density of the sludge being greater at the bottom of the sludge layer than at the top.

In the practice of this invention, at least part of the settled sludge is maintained under anaerobic conditions — i.e., such that there is essentially no measurable amount of dissolved oxygen present in the liquid phase of the sludge — for a time sufficient to release phosphate to the liquid phase of the anaerobic settled sludge. The residence time of the sludge in the stripping zone which is required for phosphate release will depend in part on the aerobic or anaerobic character of the phosphate-enriched sludge being passed to the stripping zone. For example, it has been found that the rate of dissolved oxygen uptake (by the microorganisms present) in secondary settling zones of conventional activated sludge plants may be quite high, e.g., on the order of 20-30 parts per million/hr. With such high uptake rates, the dissolved oxygen in the mixed liquor discharged from the preceding aeration step may be depleted in the settling zone, such that the sludge underflow removed from the settling zone is anaerobic. As applied to the present invention, such anaerobic character of the phosphate-enriched sludge separated from the mixed liquor and passed to the stripping zone permits the entire volume of settled sludge in the stripping zone to be maintained under anaerobic conditions, which in turn permits a comparatively shorter sludge residence time in the stripping zone to be employed for phosphate release. When the sludge removed from the secondary settling zone and passed to the stripping zone is anaerobic in character, the residence time and quiescent condition of the sludge in the settling zone must be maintained so as to avoid release and mixing of phosphate in the secondary settling zone such as would impair the quality of the effluent discharged from the process.

On the other hand, where the phosphate-enriched sludge passed to the stripping zone is aerobic in character, a comparatively greater sludge residence time in the stripping zone will be required to achieve the requisite phosphate release. In such case, the upper portion of the settled sludge in the stripping zone may be aerobic in character, with only a lower portion of the settled sludge being anaerobic. Under these conditions, as the solids in the sludge containing intracellular phosphate migrate to the bottom of the settled sludge layer, because of the anaerobic conditions existing in this portion of the sludge layer, the organisms release phosphate to the liquid phase of the sludge in the form of water-soluble phosphate ions. The concentration of soluble phosphate is initially greatest in the lower portion of the sludge layer in the stripping zone of this system.

In the broad practice of the present invention, the residence time of the sludge in the phosphate stripper is from 2 to 30 hours. As discussed earlier herein, a considerable time is required for the soluble phosphate released by the settled solids to migrate out of the settled solids layer and into the supernatant liquor. If the sludge is withdrawn and recycled to the aeration zone before a sufficient amount of the soluble phosphate is transferred to the supernatant liquor, an excess amount of soluble phosphate will be recycled to the aeration tank and the phosphate removal efficiency of the overall process will be lowered. It is preferred that no more than 75% of the soluble phosphate which is released in the phosphate stripper be recycled to the aeration tank with the recycle activated sludge.

According to one embodiment of the invention, anaerobic sludge containing a substantial portion of the soluble phosphate which is released in the phosphate stripper 9 is withdrawn from the phosphate stripper and split into two portions. One portion of this high soluble phosphate-containing sludge is recycled through line 13 for mixing with the raw sewage which is being fed to the aeration tank in line 4, and the other portion of anaerobic, high soluble phosphate-containing sludge is recycled through line 14 for contacting and mixing with phosphate-enriched sludge from the secondary settling tank 6 as it is being passed to the phosphate stripper 9. Since the sludge withdrawn from the secondary settling tank 6 contains intracellular phosphate in the solids phase thereof and since the liquid phase, which may comprise 98 to 99% of the sludge, contains little or no soluble phosphate, soluble phosphate from the high soluble phosphate-containing anaerobic sludge portion from line 14 is transferred to the liquid phase of the phosphate-enriched sludge. It is preferred that each of the high soluble phosphate-containing anaerobic sludge portions withdrawn from the stripper and passed through lines 13 and 14 comprise from about 25 to 75% of the total amount of high soluble phosphate-containing sludge withdrawn from the stripper and that at least 25% of the soluble phosphate released in the stripper be removed from the stripper along with the supernatant liquor in line 10.

The portion of the high soluble phosphate-containing sludge in line 14 may also be introduced directly into the phosphate stripper 9 above the sludge layer contained therein so that the soluble phosphate will come in contact with the supernatant in the phosphate stripper and be transferred thereto.

In the embodiment of the invention shown in FIG. 2, phosphate-containing influent sewage material is introduced to the sewage treatment system by line 15 and mixed with the phosphate-depleted supernatant liquor from line 34, to be described more fully hereinafter. The influent sewage and recycle sludge in line 24 are passed into aeration zone 16 wherein the mixed liquor formed from the sewage material and the recycled activated sludge are aerated to reduce the BOD content of the sewage and to cause the microorganisms present to take up phosphate.

In practice, the aeration zone may be of a conventional type wherein atmospheric air is used as the oxidant in open aeration chambers. Alternatively, the aeration may be conducted in a manner as taught by U.S. Pat. Nos. 3,547,813–3,547,815 to J. R. McWhirter et al in which at least one enclosed covered aeration chamber is employed wherein the liquid undergoing treatment is intimately contacted in the presence of activated sludge with oxygen enriched gas from an overlying gas space to dissolve the oxygen necessary for aerobic biological activity. Such oxygenation systems are able to operate at biological suspended solids levels several times greater and aeration detention periods several times less than those of conventional air aeration systems while maintaining comparable or higher overall levels of treatment, and have been found to be highly effective in the practice of the present invention.

The aerated mixed liquor is conducted from the aeration zone in line 17 and passed to the secondary settling zone 18. In the settling zone, phosphate-enriched sludge is separated from the mixed liquor to provide a substantially phosphate-free effluent which is discharged from the system in line 19. The separated phosphate-enriched sludge is passed from the secondary settling zone by line 20 to the phosphate stripping zone 21. In the stripping zone, the phosphate-enriched sludge is settled to form supernatant liquor in the upper section 22 of the stripping zone, and settled sludge. At least part of the settled sludge in the stripping zone is maintained under anaerobic conditions in the same manner previously described for a time sufficient to release phosphate to the liquid phase of the anaerobic sludge.

The anaerobic sludge contacting step is conducted in this system by withdrawing supernatant liquor from the stripping zone upper section in line 25 and diverting a portion thereof into line 26, having pump means 27 disposed therein, for recirculation to the stripping zone lower section. The diverted supernatant liquor in line 26 is reintroduced into the phosphate stripping zone by the sparging means 28, which may for example comprise multiple stationary nozzles. In this manner a countercurrent elutriation of the soluble phosphate in the anaerobic sludge is established, as the soluble phosphate is transferred to the upflowing recirculated supernatant liquor and subsequently to the bulk liquid volume of the supernatant liquor in the stripping zone upper section. In this contacting arrangement, it is apparent that any dissolved oxygen content in the stripping zone supernatant liquor, as for example may result from passing aerobic phosphate-enriched sludge from the secondary settling zone to the phosphate stripping zone, will be passed into the lower section of the stripping zone along with the contacting stream in line 26. Such introduction of dissolved oxygen will cause the microorganisms in the settled solids layer where the contacting stream is introduced, which have released phosphate to the associated liquid phase to again take up such released phosphate. This effect should be localized in the immediate vicinity of the introduction means so as not to adversely affect the anaerobic conditions in the bulk volume of anaerobic settled sludge in the stripping zone. In other words, the dissolved oxygen content of the supernatant liquor should be controlled by appropriate design.

The portion of the supernatant liquor withdrawn from the stripping zone in line 25 which is not diverted as recycle contacting medium in line 26 is flowed to quick mix tank 29. In this tank, the undiverted supernatant liquor is rapidly mixed (by means not shown) with a phosphate precipitant, e.g., lime, introduced to the tank by means of line 30. The supernatant liquor-phosphate precipitant mixture is then passed by line 31 to flocculator tank 32 in which the precipitated phosphate is settled and removed from the system as waste chemical sludge in line 33. The overflow phosphate-depleted supernatant from the flocculator tank 32 is recycled in line 34 for joining with the sewage influent entering the process in line 15.

By means of the above described anaerobic sludge contacting scheme, a significant amount of the phosphate which is released in the anaerobic sludge is transferred to the supernatant liquor in the stripping zone upper section, whereby the anaerobic sludge withdrawn from the bottom of the stripping zone in line 24 has a sufficiently lowered phosphate content to permit high removal of phosphate from the sewage to be achieved in the aeration zone.

Means other than those illustratively described hereinabove may be used in the broad practice of the present invention to maximize the contact between the anaerobic sludge portion containing a high soluble phosphate content and the supernatant liquor in the phosphate stripper so that the soluble phosphate will be eluted into the supernatant liquor. For example, two or more phosphate stripping tanks may be used. While one tank is maintained in a relatively unagitated state and the sludge is maintained under anaerobic conditions so that the microorganisms will release their phosphate content, another tank, in which the microorganisms have already released their phosphate content is agitated to cause the anaerobic layer of sludge containing the soluble phosphate to mix with the supernatant liquor. After the supernatant liquor has eluted substantially all of the soluble phosphate from the sludge solids, the vigorous agitation is stopped and the solids are permitted to settle. After the solids have settled, the supernatant liquor, which then contains substantially all of the soluble phosphate in the tank, is removed and passed to a phosphate precipitator and the phosphate-depleted sludge is recycled for mixing with raw sewage which is being fed to the aeration tank. The tank is then filled with sludge from the secondary settling tank, the sludge is permitted to settle and become anaerobic and is maintained under anaerobic conditions while the previously described process of vigorously stirring the anaerobic sludge and supernatant liquor, settling, and removing a phosphate-enriched supernatant is repeated with the first tank. In other words, the two tanks are maintained 180° out of phase with each other.

Another means for effecting transfer of the soluble phosphate from the anaerobic sludge is to introduce fresh sludge from the secondary settling tank into the bottom of the stripping zone so that it diffuses up through the anaerobic layer and elutes the soluble phosphate contained in this layer.

Another means for maximizing the contact between the supernatant liquor and the anaerobic sludge layer containing a high concentration of soluble phosphate in the phosphate stripper is to intermittently and vigorously stir the contents of the phosphate stripper so that the anaerobic layer of sludge will be dispersed into the supernatant. The supernatant will thereby elute the phosphate from the sludge solids. The contents of the phosphate stripper are then permitted to settle. During agitation and settling, no recycle sludge would be removed from the bottom of the phosphate stripper. Agitation may be accomplished by introduction of a non-oxygen containing gas at the bottom of the stripper 9. Different portions of the anaerobic sludge layer may also be raised above the settled sludge layer and then permitted to settle again. During settling, the soluble phosphate is eluted by the supernatant. While this is being done, another portion of the anaerobic sludge layer may be withdrawn from the phosphate stripping zone for recycle to the aeration tank.

Any of these processes may be conducted either continuously or intermittently. Thus, sufficient transfer of soluble phosphate may be obtained in the FIG. 1 system if, for example, the anaerobic sludge withdrawn from the phosphate stripper is recycled through line 14 one hour out of every five hours of operation.

The following examples illustrate the specific advantages of the present invention in achieving high overall removals of phosphate from phosphate-containing sewage relative to the prior art process systems lacking the anaerobic sludge contacting feature of the instant process.

EXAMPLE I

In this test, a process system of a type similar to that shown in FIG. 2 herein was operated initially in the manner of the prior art without the anaerobic sludge contacting feature of the present invention. Subsequently, the system was operated in accordance with the present invention, using supernatant liquor withdrawn from the stripping zone upper section as the lower soluble phosphate content contacting medium, in a manner substantially similar to that described hereinabove in connection with FIG. 2.

In both phases of the comparative evaluation test, influent sewage was mixed with recycle activated sludge to form a mixed liquor which was then aerated in the aeration zone to cause the microorganisms present to take up phosphate. Phosphate-enriched sludge was then separated from the mixed liquor in the secondary clarifier to provide a substantially phosphate-free effluent. The separated phosphate-enriched sludge was passed to the phosphate stripping zone and settled therein to form a supernatant liquor in the stripping zone upper section, and settled sludge. The settled sludge was maintained under anaerobic conditions for a time sufficient to release phosphate to the liquid phase of the sludge and to provide a phosphate-enriched supernatant liquor. This phosphate-enriched supernatant liquor was withdrawn from the phosphate stripping zone, mixed with phosphate precipitant (lime) in a quick mix tank; the resulting precipitated phosphate was removed as waste chemical sludge in a flocculation tank and phosphate-depleted supernatant liquor was recirculated to the influent sewage line. Settled sludge was withdrawn from the phosphate stripping zone and recirculated to the influent sewage line as the aforementioned activated sludge.

In the first phase of the comparative evaluation test, operated in accordance with the prior art teachings, none of the supernatant liquor withdrawn from the stripping zone upper section was recirculated or reintroduced into the stripping zone. All of the withdrawn supernatant liquor was treated with phosphate precipitant and recirculated to the influent sewage line. As described in terms of the FIG. 2 system, the recycle pump 27, schematically shown as disposed in the recycle line 26 which is connected to the phosphate stripping zone supernatant liquor discharge line 25 and which terminates in the lower portion of the stripping zone, was not actuated and no flow was conducted through the recycle line.

In the second phase of the comparative evaluation test, operated in accordance with the present invention, the process system was operated as above, except that the aforedescribed recycle pump was actuated so as to divert a portion of the lower soluble phosphate content supernatant liquor from the stripping zone supernatant liquor discharge line and to introduce same into the phosphate stripping zone beneath the anaerobic sludge. In this manner a countercurrent elutriation of the soluble phosphate in the anaerobic sludge was established whereby the phosphate was transferred to the elutriant supernatant liquor and subsequently into the supernatant liquor in the stripping zone upper section, for phosphate enrichment thereof. The duration of the first phase test, without anaerobic sludge contacting, was 8 days of continuous operation and the second phase test, wherein anaerobic sludge contacting was employed, was continuously operated for 10 days.

The data which were taken during the comparative evaluation test of the above described systems is set forth in Table I below. These data demonstrate the substantial improvement in phosphate removal efficiency which is achieved by the process of this invention (data shown in column A) over the system which is taught by the prior art (data shown in column B). As shown by the data, the process parameters in the respective systems, including influent sewage flow rate, phosphate-enriched sludge recycle flow rate, stripping zone underflow rate, stripping zone overflow rate, mixed liquor suspended solids under aeration, mixed liquor volatile suspended solids under aeration, influent biochemical oxygen demand ($BOD_5$), and effluent biochemical oxygen demand ($BOD_5$) all had closely corresponding measured numerical values. Accordingly, the entries in the Table relating to measured phosphate concentrations in selected process streams in the two systems,

TABLE I

| Process Parameter | "A" Process featuring anaerobic sludge contacting | "B" Process without anaerobic sludge contacting |
|---|---|---|
| Influent Flow Rate, gpm | 12.1 | 12.0 |
| Phosphate-Enriched Sludge Recycle Flow Rate (Sludge From Secondary Settling Zone Passed To Stripper), gpm | 3.0 | 3.0 |
| Stripping Zone Underflow Rate, gpm | 1.4 | 1.4 |
| Stripping Zone Overflow Rate, gpm | 1.6 | 1.6 |
| Mixed Liquor Suspended Solids In Aeration Zone, mg./l. | 2929 | 3448 |
| Mixed Liquor Volatile Suspended Solids In Aeration Zone, mg./l. | 2324 | 2454 |
| Influent $BOD_5$, mg./l. | 78 | 51 |
| Effluent $BOD_5$, mg./l. | 10 | 16 |
| Influent Phosphate*, mg./l. | 5.3 | 4.2 |
| Effluent Phosphate*, mg./l. | 0.7 | 3.5 |
| Percentage Overall Phosphate*Removal | 87% | 16.7% |
| Phosphate*In Stripper Underflow, mg/l. | 468 | 685 |
| Phosphate*In Stripper Supernatant, mg./l. | 35 | 4.9 |

*Measured as total phosphorous content vis., phosphate in the influent sewage, phosphate in the effluent sewage, phosphate overall percentage removal, phosphate in the stripper underflow, and phosphate in the stripper supernatant liquor, clearly demonstrate that the process of this invention, wherein the anaerobic sludge containing released phosphate is contacted with a lower soluble phosphate content medium to effect an ultimate transfer to and enrichment of the supernatant liquor in the stripping zone, provides a substantially enhanced overall removal of phosphate (87% v. 16.7%) from the sewage being treated relative to the prior art process, which did not employ such anaerobic sludge contacting step.

The reason for such striking difference in phosphate removal levels between the respective systems is readily apparent based on a comparison of the phosphate concentrations in the phosphate stripper underflow and supernatant in these systems. In the process conducted in accordance with the present invention (data tabulated in column A), the phosphate stripper underflow phosphate concentration was 468 milligrams/liter and the phosphate stripper supernatant liquor concentration was 35 milligrams/liter, whereas in the prior art process corresponding phosphate concentrations were 685 milligrams/liter in the stripper underflow and only 4.9 milligrams/liter in the stripping zone supernatant liquor. These data indicate that in the prior art process, the phosphate released by the anaerobic sludge was retained in the settled sludge layer and was not significantly transferred to the supernatant liquor in the stripping zone, whereas in the process according to the present invention a substantial transfer of the phosphate, concommitant with significantly higher overall phosphate removals than the prior art process, were achieved.

EXAMPLE II

In this second Example, activated sludge wastewater treatment systems were operated side by side to evaluate the performance behavior of a system operating in accordance with the FIG. 1 embodiment, as described herein above, with a wasterwater treatment system operating without phosphate stripping treatment. The systems were operated side by side, concurrently, and processed respective portions from a common feedstream of raw sewage. Each treatment system included a primary sedimentation tank, an aeration tank, and a secondary sedimentation tank. Oxygenation of mixed liquor in the respective aeration tanks was provided by diffused air.

In the test program, influent raw sewage containing approximately 174mg/l was introduced to the primary sedimentation tanks in the respective systems and an effluent was removed from the secondary settling tanks, following aeration, which contained an average BOD concentration of approximately 6 mg/l. The comparative tests were run for a period of 15 days. In the control system, representing the prior art process without phosphate stripping treatment, sludge underflow from the secondary sedimentation tank was recycled directly to the aeration tank without any intermediate treatment. In the system operated in accordance with the FIG. 1 embodiment of the invention, operating on the same raw sewage stream as the control system, phosphate-enriched sludge underflow from the secondary sedimentation tank was passed to a phosphate stripping zone and settled therein to form supernatant liquor in the stripping zone upper section, and settled sludge in the stripping zone lower section. At least part of the settled sludge was maintained under anaerobic conditions for retention time of 14.9 hours to release phosphate to the liquid phase of the settled sludge. Anaerobic sludge containing released phosphate was withdrawn from the phosphate stripping zone. A portion thereof was recycled to the aeration zone as the activated sludge and another portion was mixed with the phosphate-enriched sludge being passed to the phosphate stripping zone, as described above. The purpose of such mixing was to transfer the soluble phosphate in the liquid phase of the anaerobic sludge to the liquid phase of the phosphate-enriched sludge being passed to the stripping zone, for a phosphate enrichment of the supernatant liquor in the stripping zone upper section. The phosphate-enriched supernatant liquid from the phosphate stripper was passed to a phosphate precipitation mixing chamber in which the supernatant liquid was mixed with a lime slurry for precipitation of the phosphate content of the former stream. The lime-phosphorus precipitate was dischared from the mixing chamber by gravity to the process influent stream for removal of the precipitate with raw sludge in the primary sedimentation tank.

The data which were taken during the 15 day steady state test program are set forth in Table II below. These data show that for the same influent flow rate of 5.74 millions gallons per day (MGD) of raw sewage containing 7.4 mg/l influent phosphate, the process of this invention, featuring anaerobic sludge contacting with the phosphate-enriched sludged passed to the stripping zone, provided a substantially higher removal of phosphate from the sewage (89% versus 18%) than did the process operated without phosphate stripping treatment.

TABLE II

| Process Parameter | "C" Process featuring anaerobic sludge contacting | "D" Process without anaerobic sludge contacting |
|---|---|---|
| Influent Flow Rate, mgd | 5.74 | 5.74 |
| Phosphate-Enriched Sludge Recycle Flow Rate (Sludge From Secondary Settling Zone Passed To Stripper), gpm | 1.34 | — |
| Stripping Zone Underflow Rate, gpm | 0.59 | — |
| Stripping Zone Overflow Rate, gpm | 0.75 | — |
| Sludge Suspended Solids From Secondary Clarifier, mg./l. | 3650 | 3650 |
| Stripping Zone Retention Time, Hrs. | | |
| Influent BOD$_5$, mg./l. | 174 | 74 |
| Effluent BOD$_5$, mg./l. | 6 | 6 |
| Influent Phosphate*, mg./l. | 7.4 | 7.4 |
| Effluent Phosphate*, mg./l. | 0.81 | 6.1 |
| Percentage Overall Phosphate*Removal | 89% | 18% |
| Phosphate*In Stripper Underflow, mg./l. | 8,160 | — |
| Phosphate* In Stripper Supernatant, mg./l. | 40.5 | — |

*Measured as othophosphate content

EXAMPLE III

Raw sewage (about 1,000,000 gallons per day g.p.d.) containing about 100 parts per million (p.p.m.) of solids and about 10 p.p.m. of total phosphate is passed through conventional screening and grit-removing units and is mixed with recycle activated sludge (about 100,000 g.p.d.) containing about 50 p.p.m. of soluble phosphate. The mixed liquor is fed to an aeration zone and is aerated at a rate of 2 cubic feet of air per gallon of sewage for 6 hours. The effluent mixed liquor from the aeration zone is fed to a secondary settling tank. Clarified waste liquor which is substantially free of phosphate is discharged to the effluent outflow after chlorination at a rate of about 1,000,000 g.p.d. The settled mixture of phosphate-enriched sludge is withdrawn from the secondary settling tank at a rate of about 210,000 g.p.d. A portion of this sludge (about 10,000 g.p.d.) is passed to waste sludge, and the remainder is passed to an anaerobic phosphate stripper wherein it is held under anaerobic conditions for about 10 hours. The conditions existing in the stripper induce considerable quantities of intracellular phosphate to be released by the microorganisms. The sludge is permitted to thicken and settle under slow mechanical stirring, which stirring is not sufficient to infuse the phosphate secreted by the sludge layer into the supernatant liquor at a fast enough rate to render the process satisfactorily efficient. Thus, the soluble phosphate which is released by the microorganisms tends to remain in the anaerobic settled sludge. The anaerobic sludge is removed from the bottom of the phosphate stripper at a rate of 200,000 g.p.d. A portion of this anaerobic sludge (100,000 g.p.d.) is recycled for mixing with incoming raw sewage and the remainder (100,000 g.p.d.) is recycled for mixing with aerobic sludge withdrawn from the secondary settling tank as it is being passed to the phosphate stripper. The soluble phosphate contained in the anaerobic sludge portion is thus transferred to the liquid phase of the aerobic sludge, and the soluble phosphate is thereby distributed into the supernatant liquor in the stripper tank. Phosphate-enriched supernatant liquor containing about 50 p.p.m. of soluble phosphate (100,000 g.p.d.) is withdrawn from the stripper tank and fed to a chemical precipitation tank where lime is added and mixed to form a phosphate precipitate. The precipitated phosphorous is recycled and mixed with influent raw sewage. In the aeration zone, the soluble phosphate introduced along with the recycled sludge from the phosphate stripper is taken up by the microorganisms present in the sludge along with the phosphate contained in the influent sewage.

Although illustrative embodiments of the invention have been set forth above which variously employ supernatant liquor and phosphate-enriched sludge as a lower soluble phosphate content medium, it is apparent that other such media, as for example a portion of the aerated mixed liquor taken from the stream being passed from the aeration tank to the secondary settling tank may be used in the contacting of the anaerobic sludge containing released phosphate in accordance with the process of this invention. Thus, although preferred embodiments of this invention have been described in detail it will be appreciated that other embodiments are contemplated only with modification of the disclosed features, as being within the scope of the invention.

What is claimed is:

1. An activated sludge sewage treatment process which comprises aerating a mixed liquor comprising phosphate-containing influent sewage material and activated sludge in an aeration zone to reduce the BOD content of said sewage material and to cause the microorganisms present to take up phosphate; separating a phosphate-enriched sludge, in which the phosphate is present in the sludge solids, from the mixed liquor to provide a substantially phosphate-free effluent; passing said phosphate enriched sludge to a phosphate stripping zone and settling said phosphate-enriched sludge to form supernatant liquor in said stripping zone upper section, and settled sludge; maintaining at least part of said settled sludge under anaerobic conditions for a time sufficient to release phosphate from the sludge solids to the liquid phase of said settled sludge; contacting the anaerobic sludge containing released phosphate in the liquid phase thereof with a lower soluble phosphate content aqueous medium to transfer the soluble phosphate in the anaerobic sludge liquid phase to said lower soluble phosphate content aqueous medium, for phosphate enrichment of supernatant liquor in said stripping zone upper section; and recycling at least a portion of said anaerobic sludge from said phosphate stripping zone to said aeration zone as said activated sludge.

2. A process as defined in claim 1 wherein the residence time of the sludge in said phosphate stripping zone is from 2 to 30 hours.

3. A process as defined in claim 1 wherein no more than 75% of the soluble phosphate which is released in said phosphate stripping zone is recycled to said aeration zone in said anaerobic sludge recycled from said phosphate stripping zone to said aeration zone as said activated sludge.

4. A process as defined in claim 3 wherein the contents of said phosphate stripping zone are continuously or intermittently agitated after the microorganisms in said anaerobic sludge have released their phosphate to cause the anaerobic sludge containing the soluble phosphate to mix with the supernatant liquor, thereafter permitting said sludge solids to settle, whereby the soluble phosphate content of said anaerobic sludge is transferred to the supernatant liquor in said phosphate stripping zone.

5. A process as defined in claim 3 wherein a portion of the supernatant liquor in said phosphate stripping zone is withdrawn therefrom and is reintroduced into said phosphate stripping zone underneath said anaerobic sludge containing released phosphate, whereby a countercurrent elutriation of the soluble phosphate in said anaerobic sludge is established.

6. A process as defined in claim 3 wherein at least a portion of said phosphate-enriched sludge which is passed to said phosphate stripping zone is introduced into said phosphate stripping zone beneath said anaerobic sludge containing released phosphate, whereby a countercurrent elutriation of the soluble phosphate in said anaerobic sludge is established.

7. A process as defined in claim 3 wherein the contents of said phosphate stripping zone are intermittently agitated by the introduction of a non-oxygen containing gas underneath anaerobic sludge containing released phosphate.

8. A process as defined in claim 3 wherein a portion of said anaerobic sludge containing released phosphate in the liquid phase thereof is raised into said supernatant liquor in said stripping zone and is then permitted to resettle, so that released phosphate in the liquid phase of said raised anaerobic sludge is eluted by said supernatant liquor during said resettling.

9. A process as defined in claim 1 wherein anaerobic sludge containing released phosphate in the liquid phase thereof is withdrawn from said phosphate stripping zone and reintroduced into said supernatant liquor in said stripping zone for transfer of the released phosphate from the liquid phase of the reintroduced anaerobic sludge to said supernatant liquor for said phosphate enrichment thereof.

10. A process as defined in claim 1 wherein phosphate-enriched supernatant liquor is withdrawn from said phosphate stripping zone and mixed with a phosphate precipitant to precipitate phosphate therefrom.

11. An activated sludge sewage treatment process which comprises aerating a mixed liquor comprising phosphate-containing influent sewage material and activated sludge in an aeration zone to reduce the BOD content of said sewage material and to cause the microorganisms present to take up phosphate; separating a phosphate-enriched sludge, in which phosphate is present in the sludge solids, from the mixed liquor to provide a substantially phosphate-free effluent; passing said phosphate-enriched sludge to a phosphate stripping zone and settling said phosphate-enriched sludge to form supernatant liquor in said stripping zone upper section, and settled sludge; maintaining at least part of said settled sludge under anaerobic conditions for a time sufficient to release phosphate from the sludge solids to the liquid phase of said settled sludge; withdrawing anaerobic sludge containing released phosphate in the liquid phase thereof from said phosphate stripping zone, recycling a portion thereof to said aeration zone as said activated sludge and mixing another portion thereof with the phosphate-enriched sludge being passed to said phosphate stripping zone, to transfer the soluble phosphate in the liquid phase of said anaerobic sludge another portion to the liquid phase of said phosphate-enriched sludge, for phosphate enrichment of supernatant liquor in said stripping zone upper section.

12. A process as defined in claim 11 wherein the residence time of the sludge in said phosphate stripping zone is from 2 to 30 hours.

13. A process as defined in claim 11 wherein no more than 75% of the soluble phosphate which is released in said phosphate stripping zone is recycled to said aeration zone in said anaerobic sludge recycled from said phosphate stripping zone to said aeration zone as said activated sludge.

14. A process as defined in claim 11 wherein from 25 to 75% of said withdrawn anaerobic sludge is recycled to said aeration zone as said activated sludge and from 25 to 75% of said withdrawn anaerobic sludge is mixed with the phosphate-enriched sludge being passed to said phosphate stripping zone.

15. A process as defined in claim 14 wherein at least 25% of the soluble phosphate released in said phosphate stripping zone is removed from said phosphate stripping zone in the phosphate-enriched supernatant liquor.

16. An activated sludge sewage treatment process which comprises aerating a mixed liquor comprising phosphate-containing influent sewage material and activated sludge in an aeration zone to reduce the BOD content of said sewage material and to cause the microorganisms present to take up phosphate; separating a phosphate-enriched sludge, in which the phosphate is present in the sludge solids, from the mixed liquor to provide a substantially phosphate-free effluent; passing said phosphate-enriched sludge to a phosphate stripping zone and settling said phosphate-enriched sludge to form supernatant liquor in said stripping zone upper section, and settled sludge; maintaining at least part of said settled sludge under anaerobic conditions for a time sufficient to release phosphate from the sludge solids to the liquid phase of said settled sludge; contacting the anaerobic sludge containing released phosphate in the liquid phase thereof with supernatant liquor formed in said stripping zone upper section to transfer the soluble phosphate in the anaerobic settled sludge liquid phase to said supernatant liquor for phosphate enrichment of supernatant liquor in said stripping zone upper section; and recycling at least a portion of said anaerobic sludge from said phosphate stripping zone to said aeration zone as said activated sludge.

17. An activated sludge sewage treatment process which comprises aerating a mixed liquor comprising phosphate-containing influent sewage material and activated sludge in an aeration zone to reduce the BOD content of said sewage material and to cause the microorganisms present to take up phosphate; separating a phosphate-enriched sludge, in which the phosphate is present in the sludge solids, from the mixed liquor to provide a substantially phosphate-free effluent; passing said phosphate-enriched sludge to a phosphate stripping zone and settling said phosphate-enriched sludge to form supernatant liquor in said stripping zone upper section, and settled sludge; maintaining at least part of said settled sludge under anaerobic conditions for a time sufficient fo release phosphate from the sludge solids to the liquid phase of said settled sludge; contacting the anaerobic sludge containing released phosphate in the liquid phase thereof with said phosphate-enriched sludge passed to said stripping zone, to transfer the soluble phosphate in the liquid phase of said anaerobic sludge to the liquid phase of said phosphate-enriched sludge, for phosphate enrichment of supernatant liquor in said stripping zone upper section, and recycling at least a portion of said anaerobic sludge from said phosphate stripping zone to said aeration zone as said activated sludge.

* * * * *